(12) United States Patent
Kamiya et al.

(10) Patent No.: US 9,149,932 B2
(45) Date of Patent: Oct. 6, 2015

(54) ROBOT PICKING SYSTEM, CONTROL DEVICE, AND METHOD OF MANUFACTURING A WORKPIECE

(71) Applicant: KABUSHIKI KAISHA YASKAWA DENKI, Kitakyushu-shi (JP)

(72) Inventors: Yosuke Kamiya, Fukuoka (JP); Shingo Ando, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/181,725

(22) Filed: Feb. 17, 2014

(65) Prior Publication Data
US 2014/0277731 A1  Sep. 18, 2014

(30) Foreign Application Priority Data
Mar. 18, 2013  (JP) .................................. 2013-055221

(51) Int. Cl.
*B25J 19/02* (2006.01)
*B25J 9/10* (2006.01)
*G05B 15/00* (2006.01)
*G05B 19/00* (2006.01)
*G06F 7/00* (2006.01)
*B25J 9/16* (2006.01)

(52) U.S. Cl.
CPC .............. *B25J 9/1697* (2013.01); *B25J 9/1676* (2013.01); *G05B 2219/40053* (2013.01)

(58) Field of Classification Search
USPC ................. 700/259, 245, 258, 213, 219, 214; 345/419; 318/568.1, 568.11, 568.16, 318/568.17, 567; 901/1, 2, 14, 15, 30, 31, 901/46, 47
See application file for complete search history.

(56) References Cited

U.S. PATENT DOCUMENTS

| | | | | | |
|---|---|---|---|---|---|
| 4,305,130 | A | * | 12/1981 | Kelley et al. ................... | 700/259 |
| 4,402,053 | A | * | 8/1983 | Kelley et al. ................... | 700/259 |
| 2005/0071048 | A1 | | 3/2005 | Watanabe et al. | |
| 2006/0017720 | A1 | * | 1/2006 | Li ................................. | 345/419 |
| 2006/0072988 | A1 | | 4/2006 | Hariki et al. | |

(Continued)

FOREIGN PATENT DOCUMENTS

| | | |
|---|---|---|
| CN | 1733579 | 2/2006 |
| CN | 1738699 | 2/2006 |

(Continued)

OTHER PUBLICATIONS

Japanese Office Action for corresponding JP Application No. 2013-055221, Sep. 2, 2014, w/ English translation of relevant portion.

(Continued)

*Primary Examiner* — Ronnie Mancho
(74) *Attorney, Agent, or Firm* — Mori & Ward, LLP

(57) ABSTRACT

A robot picking system includes a robot that picks up a work in a first stocker accommodating a plurality of works, a control device that controls an operation of the robot, and an image acquiring device that acquires image data including information related to the plurality of works. The control device includes a candidate data generating unit that generates candidate data including information of candidate works that are candidates of a picking-up target using the image data, and a target work selecting unit that selects a target work that is a picking-up target from the candidate works using the candidate data.

19 Claims, 8 Drawing Sheets

(56) References Cited

U.S. PATENT DOCUMENTS

| | | | |
|---|---|---|---|
| 2006/0095160 A1* | 5/2006 | Orita et al. | 700/248 |
| 2006/0184272 A1 | 8/2006 | Okazaki et al. | |
| 2007/0239315 A1* | 10/2007 | Sato et al. | 700/245 |
| 2011/0222995 A1 | 9/2011 | Irie et al. | |
| 2012/0029686 A1 | 2/2012 | Ban et al. | |
| 2012/0158180 A1 | 6/2012 | Iio et al. | |

FOREIGN PATENT DOCUMENTS

| | | |
|---|---|---|
| CN | 101273688 | 10/2008 |
| CN | 102343590 | 2/2012 |
| EP | 2345515 | 7/2011 |
| EP | 2364823 | 9/2011 |
| JP | 2011-183537 | 9/2011 |
| JP | 2012-125886 | 7/2012 |
| WO | WO 2007/083039 | 7/2007 |

OTHER PUBLICATIONS

European Patent Office Communication for corresponding EP Appiication No. 14155198.9-1807, Sep. 29, 2014.
Extended European Search Report for corresponding EP Application No. 14153188.9-1807, Aug. 18, 2014.
Chinese Office Action for corresponding CN Application No. 201410062122.3, May 29, 2015.

* cited by examiner

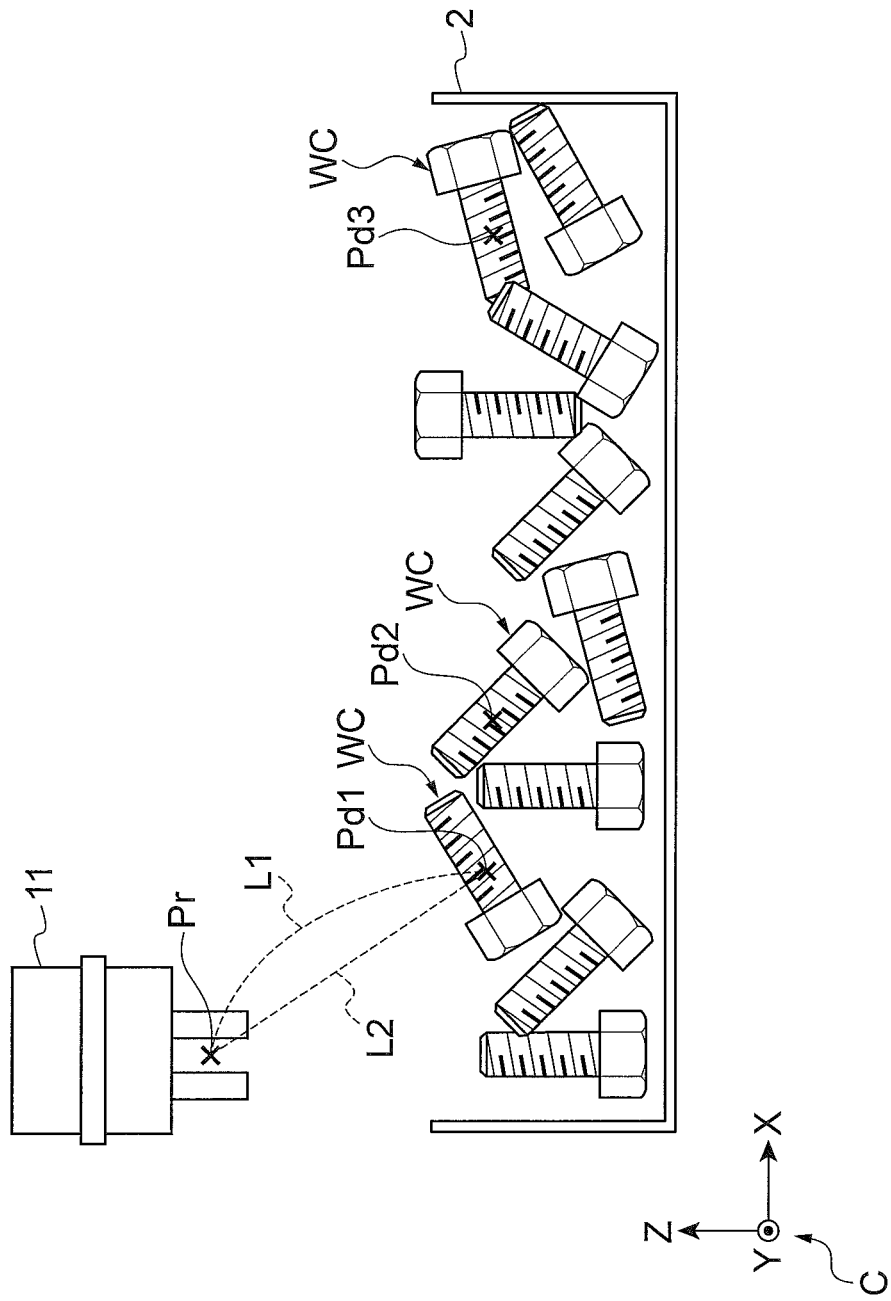

ROBOT PICKING SYSTEM, CONTROL DEVICE, AND METHOD OF MANUFACTURING A WORKPIECE

CROSS-REFERENCE TO RELATED APPLICATION

This application is based upon and claims the benefit of priority from Japanese Patent Application No. 2013-055221, filed Mar. 18, 2013, the entire contents of which are incorporated herein by reference.

BACKGROUND

1. Field

The present disclosure relates to a robot picking system, a control device and a method of manufacturing a workpiece.

2. Description of the Related Art

There is a picking technique of taking out a corresponding work from a stocker in which works having the same shape such as bolts are randomly accommodated and holding the corresponding work. A robot picking system using a picking technique is disclosed in JP 2011-183537 A. The robot picking system inspects a holding state of a work taken out by a robot, and supplies only works in which an inspection result satisfies a certain condition to a next process.

SUMMARY

In order to solve the above problem, a robot picking system according to the present disclosure includes a robot that picks up a work in a stocker accommodating a plurality of works, a control device that controls an operation of the robot, and an image acquiring device that acquires image data including information related to the work, and the control device includes a candidate data generating unit that generates candidate data including information of a candidate work that is a candidate of a picking-up target using the image data, and a target work selecting unit that selects a target work that is a picking-up target from the candidate works using the candidate data.

BRIEF DESCRIPTION OF THE DRAWINGS

FIG. 7 is a diagram for describing a method of calculating the trajectory; and

DETAILED DESCRIPTION

Figure 1:
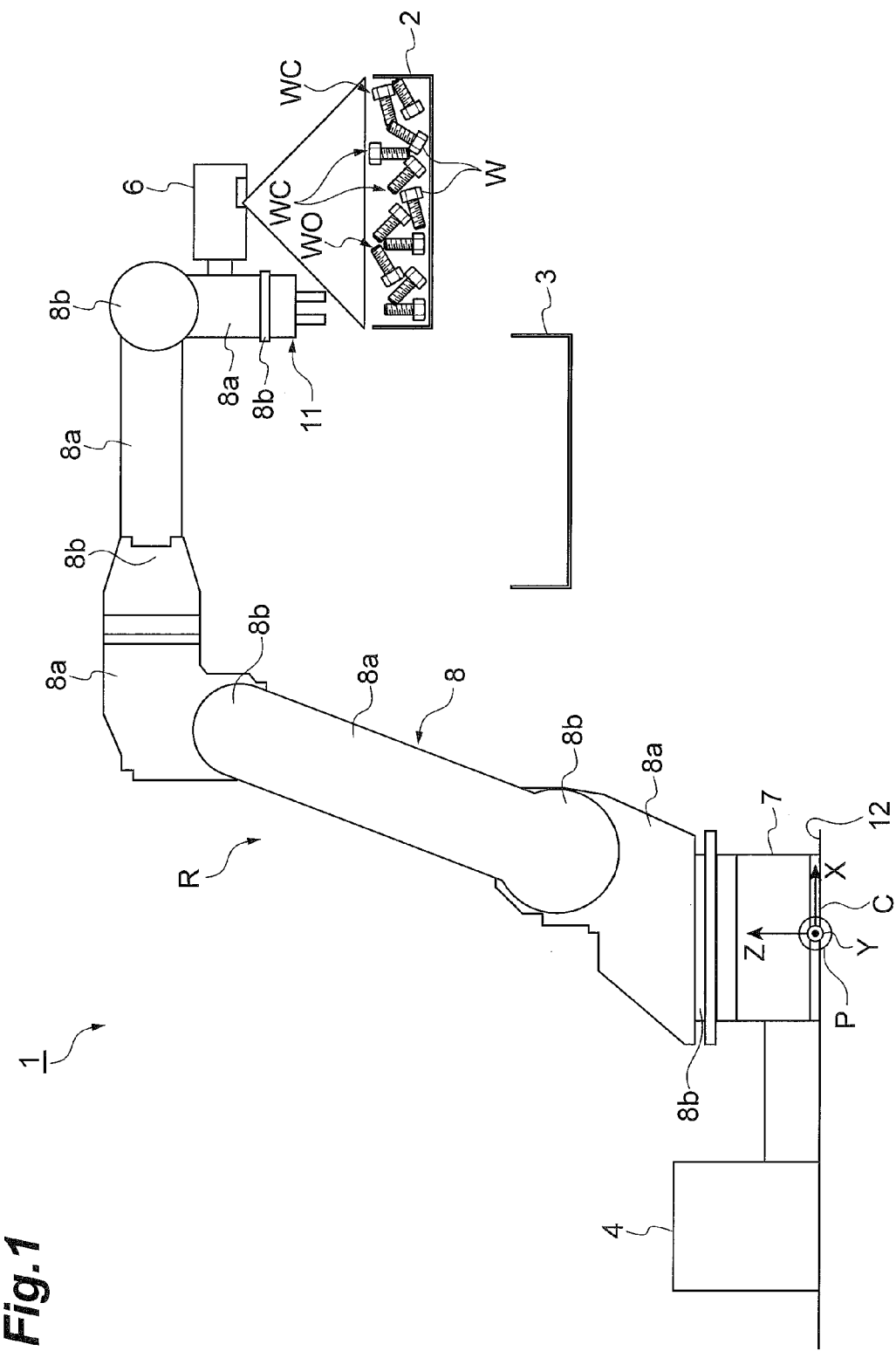
FIG. 1 is a diagram illustrating a robot picking system according to the present embodiment.

Hereinafter, a plurality of embodiments of a robot picking system, a control device and a method of manufacturing a workpiece will be described in detail with reference to the appended drawings. Note that, in the description of the drawings, the same structural elements are denoted with the same reference numerals, and repeated explanation of these structural elements is omitted.

<Robot Picking System>

FIG. 1 is a diagram illustrating a robot picking system 1 according to the present embodiment. As illustrated in FIG. 1, the robot picking system 1 picks up (takes out) works W in a first stocker 2 one by one and transfers the works W to a second stocker 3. The first stocker 2 is a container made of resin or metal, and a plurality of works W in bulk are accommodated in the first stocker 2. The works W accommodated in the first stocker 2 are parts having the same shape such as bolts. The work W picked up from the first stocker 2 is accommodated in the second stocker 3, for example, according to a predetermined arrangement or posture.

The robot picking system 1 includes a robot R that picks up the work W from the first stocker 2 and transfers the work W to the second stocker 3, a control device 4 that controls an operation of the robot R, and an image acquiring device 6 that acquires an image included in image data of the work W.

<Robot>

Figure 2:
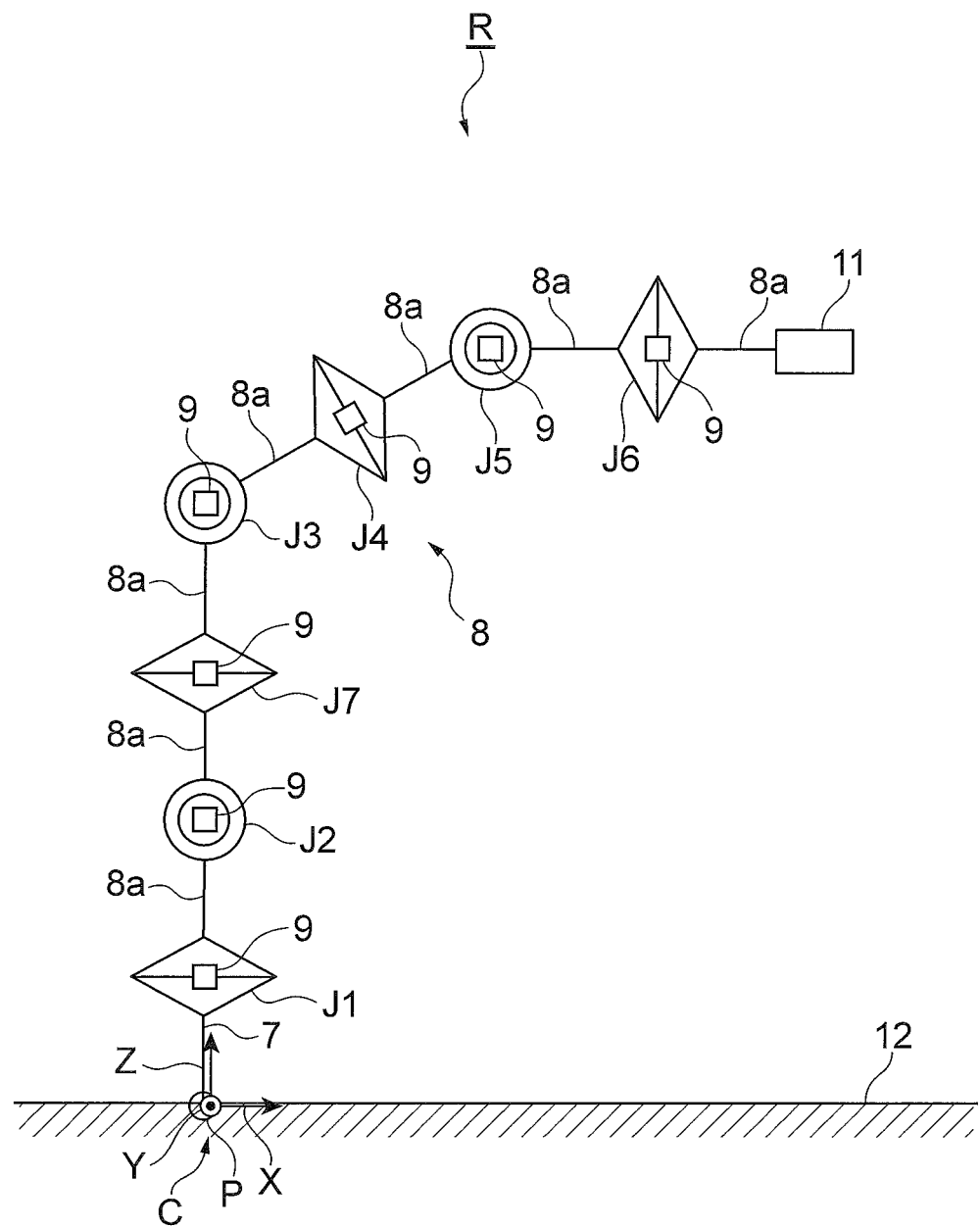
FIG. 2 is a diagram for describing a robot.

FIG. 2 is a diagram for describing the robot R. As illustrated in FIG. 2, the robot R is a so-called multi joint robot, and includes a base 7, an arm 8, and a gripper (robot end effector) 11. The base 7 is the foundation of the robot R and fixed to the floor 12. The arm 8 includes a plurality of arm sections 8a and a plurality of rotational joints J1 to J7 that connect the arm sections 8a. Thus, the robot R has a 7-degree-of-freedom constitution in which a redundant degree of freedom is added to a 6-degree-of-freedom constitution necessary for an operation in a three-dimensional space. However, a robot to which the robot picking system of the present disclosure is applied is not limited to the 7-degree-of freedom mechanism and can be applied to a 6-degree-of freedom mechanism or any other mechanism regardless of an axial constitution. A servomotor (not shown) for rotationally driving the rotational joints J1 to J7 is mounted in the arm section 8a, and the arm section 8a is controlled by a control signal input from the control device 4. Further, a sensor 9 for detecting a rotational angle is mounted in each of the rotational joints J1 to J7. The sensor 9 outputs a detected angle value to the control device 4 as sensor data (see FIG. 4). The gripper 11 is mounted to the leading end of the arm 8 of the robot R. The gripper 11 causes a pair of members to perform an opening/closing operation and holds the work W. The opening/closing operation of the gripper 11 is controlled by a control signal input from the control device 4.

A robot coordinate system C is set to the robot R. For example, in the robot coordinate system C, a direction vertical to the floor 12 on which the robot R is arranged is referred to as a Z direction, and a direction parallel to the floor 12 is referred to as an X direction.

Further, a direction (a direction vertical to a plane of paper) perpendicular to the X direction and the Z direction is referred to as a Y direction. For example, a point at which the robot R is fixed to the floor 12 is referred to as a fixed point P, and the fixed point P is used as an original point of the robot coordinate system C.

<Image Acquiring Device>

As illustrated in FIG. 1, the image acquiring device 6 is mounted to the leading end of the arm 8 of the robot R. The image acquiring device 6 acquires image data including information related to the work W, and outputs the image data to the control device 4. The image data includes image information including imaging data of a plurality of works W in the first stocker 2 and distance information of an object shown in an image. As the image acquiring device 6 capable of acquiring image data, for example, a device in which a stereo camera is combined with a distance image sensor or an image sensor is combined with a range-finding sensor may be used.

<Control Device>

Figure 3:
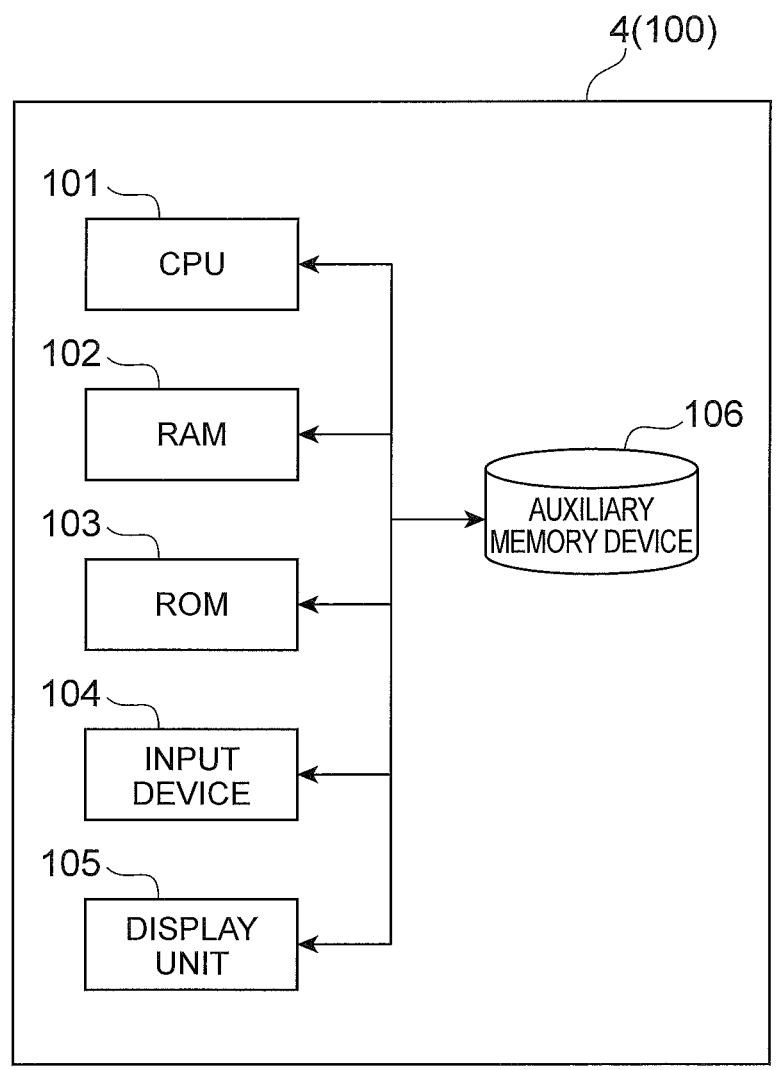
FIG. 3 is a diagram for describing a computer implementing a control device.
Figure 4:
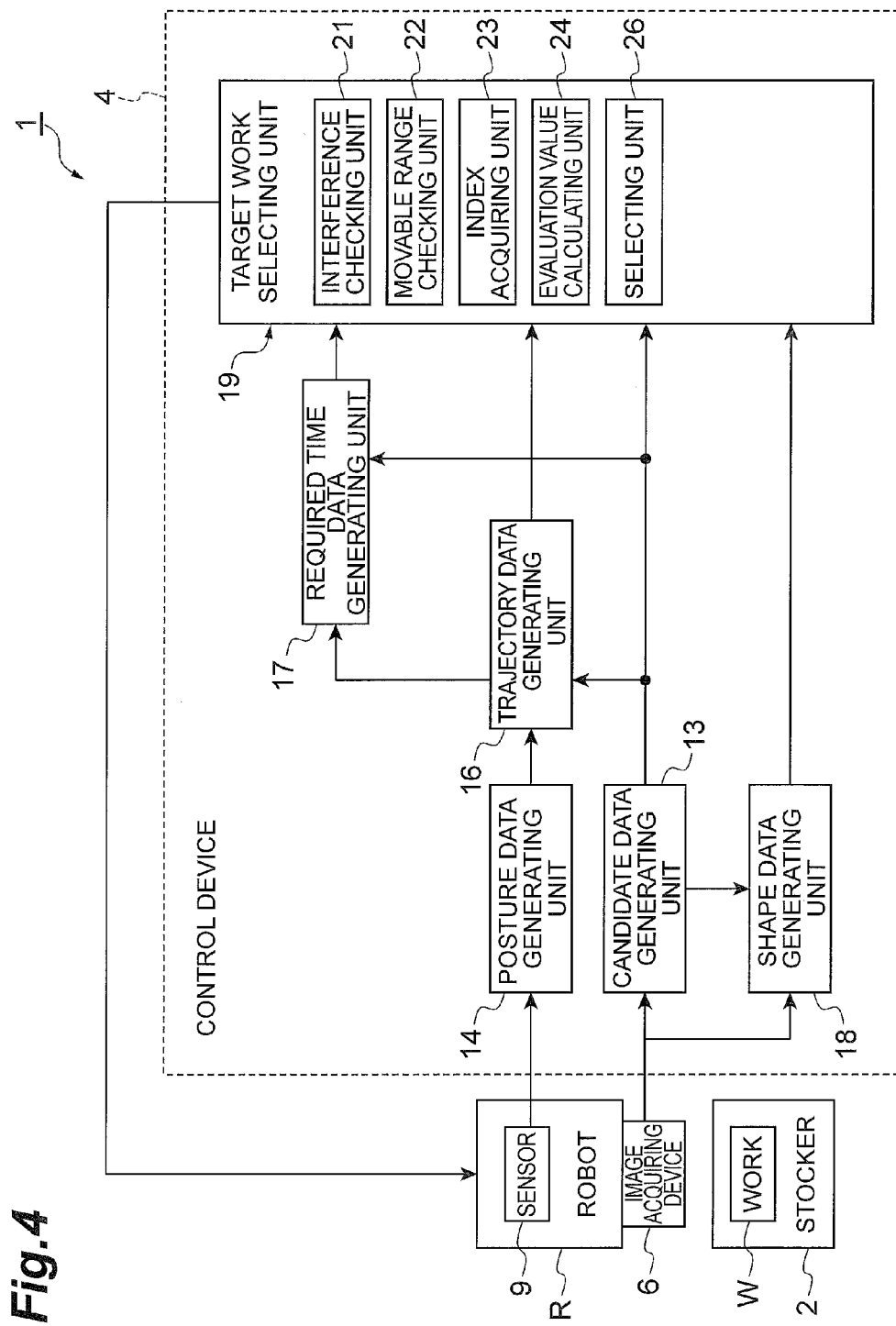
FIG. 4 is a functional block diagram of a control device.

The control device 4 outputs the control signal to the robot R, and controls an operation of the robot R. The control device 4 is configured with a computer that is connected to be able to perform communication with the robot R. FIG. 3 is a diagram for describing a computer 100 configured to implement the control device 4. FIG. 4 is a functional block diagram of the control device 4. As illustrated in FIG. 3, the computer 100 is an example of hardware configuring the control device 4 of the present embodiment. The computer 100 includes an information processing device such as a person computer that includes a central processing unit (CPU) and performs processing or control by software. The computer 100 is configured as a computer system that includes a CPU 101, a random access memory (RAM) 102 and a read only memory (ROM) 103 which are main memory devices, an input device 104 such as a keyboard, a mouse, and a programming pedant, a display unit 105 such as a display, an auxiliary memory device 106 such as a hard disk, and the like. The functional structural elements illustrated in FIG. 4 are implemented such that certain computer software is read out to hardware such as the CPU 101 and the RAM 102, the input device 104 and the display unit 105 are operated under control of the CPU 101, and data is read from or written in the RAM 102 or the auxiliary memory device 106.

As illustrated in FIG. 4, the control device 4 includes a candidate data generating unit 13, a posture data generating unit 14, a trajectory data generating unit 16, a required time data generating unit 17, a shape data generating unit 18, and a target work selecting unit 19.

<Candidate Data Generating Unit>

Image data is input to the candidate data generating unit 13 from the image acquiring device 6. The candidate data generating unit 13 generates candidate data which will be described below using image data, and outputs the candidate data to the trajectory data generating unit 16, the required time data generating unit 17, the shape data generating unit 18, and the target work selecting unit 19. Here, the candidate data refers to data including information for specifying a candidate work WC (see FIG. 1) from among the plurality of works W imaged as image data. The candidate work WC refers to a work serving as a candidate of a picking-up operation (a taking-out operation) among the plurality of works W accommodated in the first stocker 2. For the candidate work WC, for example, the distances from the position of the image acquiring device 6 to the respective works W are calculated, and the works WC are ranked in the short-distance order. A predetermined number of works W having the high ranking are selected as the candidate work WC. Specifically, the distances from the position of the image acquiring device 6 to the respective works W are calculated based on the Euclidean norm (a distance) of the difference between the center of gravity position (three variables of a translational movement amount on a three-dimensional space) of a target work WO obtained by the image acquiring device 6 and a gripping position (similarly, three variables of a translational movement amount) of the gripper 11 of the robot R. Alternatively, more simply, the distance may be referred to the Euclidean norm (a distance) of the three variables of the translational movement amount in the robot coordinate system C.

<Posture Data Generating Unit>

Angular data is input to the posture data generating unit 14 from a plurality of the sensors 9. The posture data generating unit 14 generates posture data which will be described below using angular data, and then outputs the posture data to the trajectory data generating unit 16. Here, the posture data refers to data including information about the posture and the position of the arm sections 8a and the gripper 11 of the robot R. The posture and the position are specified using the robot coordinate system C as reference coordinates. The posture data is calculated by a calculation based on the forward kinematics from the current angle based on the angular data of the sensor 9 of the robot R and link information of the robot R.

<Trajectory Data Generating Unit>

The candidate data and the posture data are input to the trajectory data generating unit 16 from the candidate data generating unit 13 and the posture data generating unit 14, respectively. The trajectory data generating unit 16 generates trajectory data which will be described below using the posture data and the candidate data, and then outputs the trajectory data to the target work selecting unit 19 and the required time data generating unit 17. Here, the trajectory data refers to data including information of the trajectory until the gripper 11 reaches each of the candidate works WC when the picking-up operation starts. The information of the trajectory may be obtained by deciding an initial state of the gripper 11 when the picking-up operation starts and calculating the trajectory in which the gripper 11 reaches each of the candidate works WC from the initial state. A method of calculating the trajectory will be described later.

<Required Time Data Generating Unit>

The candidate data and the trajectory data are input to the required time data generating unit 17 from the candidate data generating unit 13 and the trajectory data generating unit 16, respectively. The required time data generating unit 17 calculates a required time (tact time) using the candidate data and the trajectory data, generates required time data, and outputs the required time data to the target work selecting unit 19. Here, the required time data refers to data including information of the required time necessary until the gripper 11 in the initial state reaches each of the candidate works WC. Further, the required time refers to a time until the gripper 11 in the initial state reaches the candidate work WC along the trajectory. A detailed method of calculating the required time will be described later.

<Shape Data Generating Unit>

The image data and the candidate data are input to the shape data generating unit 18 from the image acquiring device 6 and the candidate data generating unit 13, respectively. The shape data generating unit 18 generates shape data using the image data, and then outputs the shape data to the target work selecting unit 19. Here, the shape data refers to shape information based on the shape of the candidate work WC. For example, the shape information includes the contour shape of the candidate work WC and the number of pixels included in an image of one candidate work WC. The shape information may be acquired using a known image processing technique.

<Target Work Selecting Unit>

The target work selecting unit 19 evaluates various kinds of data comprehensively, and selects the work W that is optimal to be picked up from the candidate work WC as the target work WO (see FIG. 1) that is a picking-up target (a taking-out target). For the selecting of the target work WO, an evaluation value Ev which will be described later is calculated for each candidate work WC, and the candidate work WC having the highest evaluation value Ev is selected as the target work WO. Then, the target work selecting unit 19 outputs a control signal to the robot R so that the picking-up operation is performed. The candidate data, the trajectory data, the required time data, and the shape data are input to the target work selecting unit 19 from the candidate data generating unit 13, the trajectory data generating unit 16, the required time data generating unit 17, and the shape data generating unit 18, respectively. The target work selecting unit 19 includes an interference checking unit 21, a movable range checking unit 22, an index acquiring unit 23, an evaluation value calculating unit 24, and a selecting unit 26.

The interference checking unit 21 will be described. There are cases in which an object serving as an obstacle to the picking-up operation is present around the robot R and the candidate work WC. For example, a sidewall of the first stocker 2 may serve as an object serving as the obstacle to the picking-up operation. The interference checking unit 21 determines whether the operation of the gripper 11 according to the trajectory is hindered by interference with the obstacle. Here, the trajectory data is specified based on the robot coordinate system C. The first stocker 2 serving as the obstacle is specified as data as well using the robot coordinate system C as the reference coordinates. In this case, since the trajectory and the obstacle are specified in the space of the same robot coordinate system C, it is possible to check the presence or absence of interference using a known calculation method. For example, the determination result is recorded such that a code of "0" is added to the candidate data when the operation of the gripper 11 is hindered but a code of "1" is added to the candidate data when the operation of the gripper 11 is not hindered.

The movable range checking unit 22 will be described. The trajectory data, movable range information of the respective rotational joints J1 to J7, and length information of the arm section 8a are input to the movable range checking unit 22. The movable range checking unit 22 determines whether an operation according to the trajectory can be performed without exceeding the movable range using these variables. The movable range is set to each of the rotational joints J1 to J7 of the robot R. A range in which the whole robot R can move is set based on the movable ranges of the rotational joints J1 to J7 and the length of the arm section 8a. Further, the movable range of the present embodiment may be a range obtained by adding a safety margin to the range in which the whole robot R can move. Alternatively, the movable range may be a range that is set in view of a singular point of the arm 8 in addition to the movable ranges of the rotational joints J1 to J7. For example, the determination result of the movable range checking unit 22 is recorded such that a code of "0" is added to the candidate data when it is not possible to move and a code of "1" is added to the candidate data when it is possible to move.

The index acquiring unit 23 will be described. The work W accommodated in the first stocker 2 is not constant in the position, the posture, and a relative relation with the work W. For this reason, among the candidate works WC selected based on the distance from the image acquiring device 6, there is a candidate work WC in a state in which it is easy for the gripper 11 to pick up or a candidate work WC in a state in which it is difficult for the gripper 11 to pick up. In this regard, the index acquiring unit 23 acquires an index representing how easy the candidate work WC is picked up (taken out) using the shape data. For example, when the shape information is the contour shape of the candidate work WC, an index representing a picking-up easiness degree is acquired by matching the detected contour shape with a contour shape in a database using the database in which a contour shape is associated with a value representing a picking-out easiness degree. Further, when the shape information is the number of pixels included in an image of one candidate work WC, an index representing a picking-up easiness degree is acquired by matching the number of pixels with information in a database using the database in which the number of pixels is associated with a value representing a picking-out easiness degree.

The evaluation value calculating unit 24 calculates the evaluation value Ev using the required time data, the index value representing the picking-up easiness degree, and the determination results of the interference checking unit 21 and the movable range checking unit 22, for example, as expressed in the following Formula (1).

$$Ev(n) = f1((\alpha/T), \beta D) \times f2(A(0,1), B(0,1)) \quad (1)$$

Here, Ev(n) represents an evaluation value of an n-th candidate work WC. The function f1 is a function having the required time and the index value as a variable. T represents the required time, and as the required time T decreases, the score of the evaluation value Ev increases. D represents the index value representing the picking-up easiness degree, and as the index value D increases, the score of the evaluation value Ev increases. The function f2 is a function having an interference check result and an operation check result as a variable. A is a variable representing the presence or absence of interference, and specified by "0: interference" or "1: no interference." B is a variable representing whether it is possible to perform an operation within the movable range and specified by "0: inoperable" or "1: operable." When it is not possible to perform interference or an operation, it can be shown that it is not possible to take out, from the Ev set of Zero(0), by using the function f2, the variable A and the variable B.

Further, $\alpha$ is a first weighting coefficient for applying a weighting to the required time, and an evaluation time ($\alpha/T$) weighted by the first weighting coefficient is referred to as first evaluation data. Further, $\beta$ is a second weighting coefficient for applying a weighting to the index value, and an index value ($\beta D$) weighted by the second weighting coefficient is referred to as second evaluation data. In the picking-up operation of the robot R, importance may be given to reducing the required time, or importance may be given to reliably performing the picking-up operation. In this regard, weighting coefficients $\alpha$ and $\beta$ are used as a coefficient for adjusting influence of the required time and the index value on the evaluation value Ev. Thus, in Formula (1), the evaluation value Ev is calculated using the first evaluation data ($\alpha/T$) and the second evaluation data ($\beta D$).

The selecting unit 26 ranks the evaluation values Ev of the respective candidate works WC, and selects the candidate work WC having the highest evaluation value Ev as the target work WO to be picked up.

Figure 5:
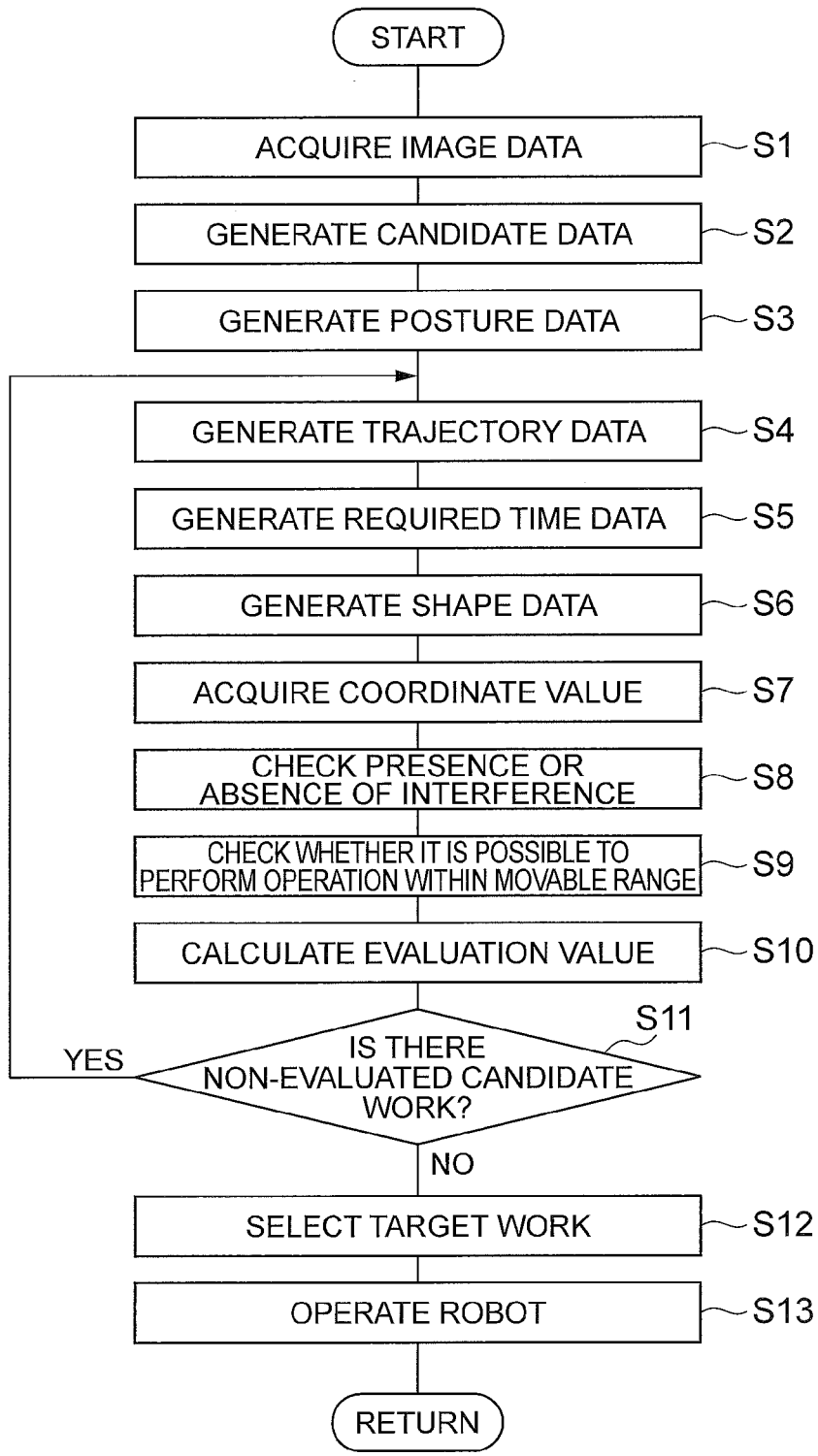
FIG. 5 is a diagram for describing a main process of performing a picking-up operation.

Next, a process of the picking-up operation performed by the robot picking system 1 will be described. FIG. 5 is a diagram for describing a main process for performing the picking-up operation. As illustrated in FIG. 5, first of all, the image data of the first stocker 2 is acquired using the image acquiring device 6, and the image data is output to the control device 4 (process S1). Then, the candidate data generating unit 13 generates the candidate data (process S2). Then, the posture data generating unit 14 generates the posture data (process S3).

Figure 6:
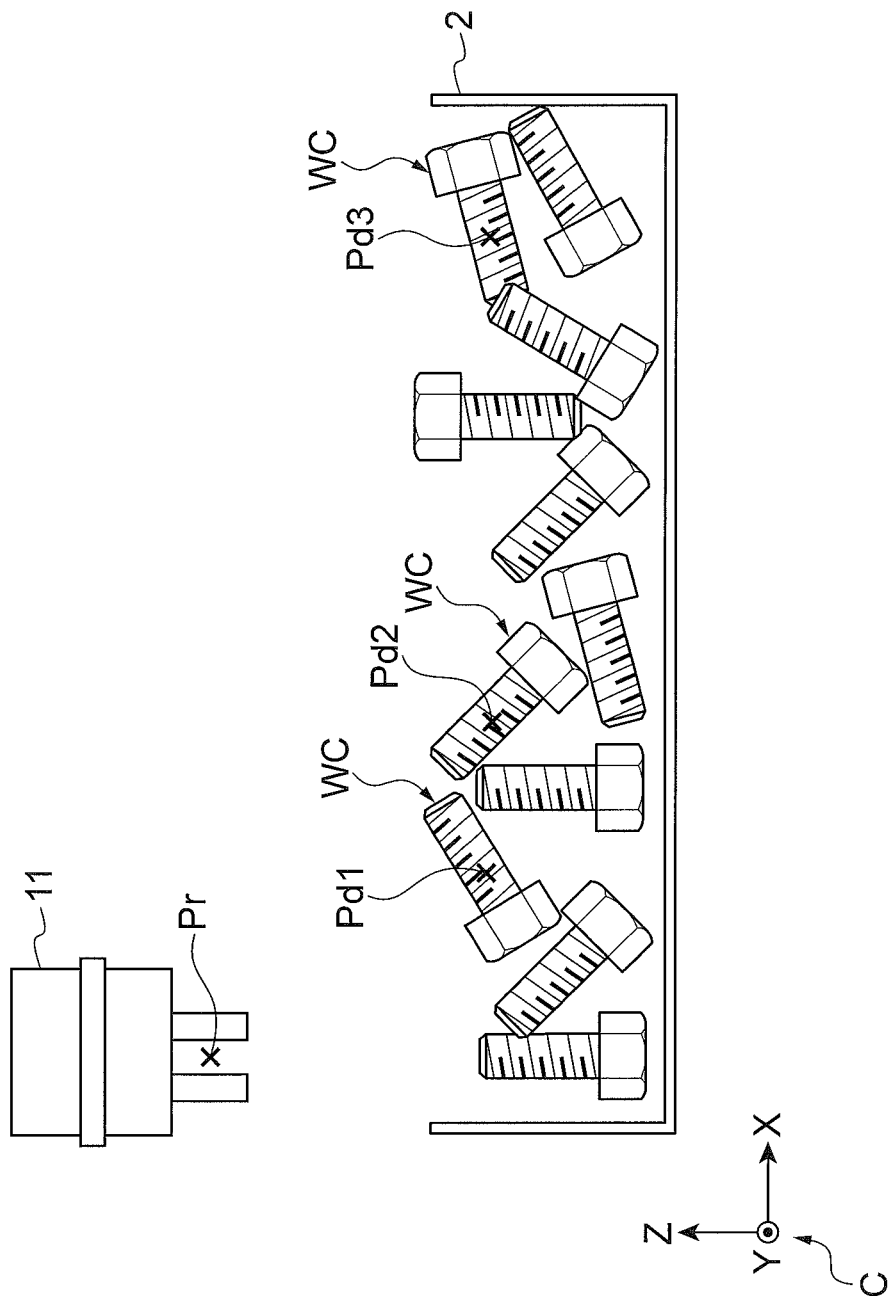
FIG. 6 is a diagram for describing a method of calculating the trajectory.

Thereafter, the trajectory data is generated (process S4). Process S4 is performed by the trajectory data generating unit 16. FIGS. 6 to 8 are diagrams for describing a method of calculating the trajectory. The description will proceed with an example of obtaining the trajectory to the candidate work WC1 having a target point Pd1 when the gripper 11 is at an initial point Pr as illustrated in FIG. 6. Here, the initial point Pr is generated based on the posture data input from the posture data generating unit 14. Since the initial point Pr generated based on the posture data is used for generation of the trajectory data as described above, it is possible to generate the high-accurate trajectory according to the working state of the robot R.

Figure 8A:
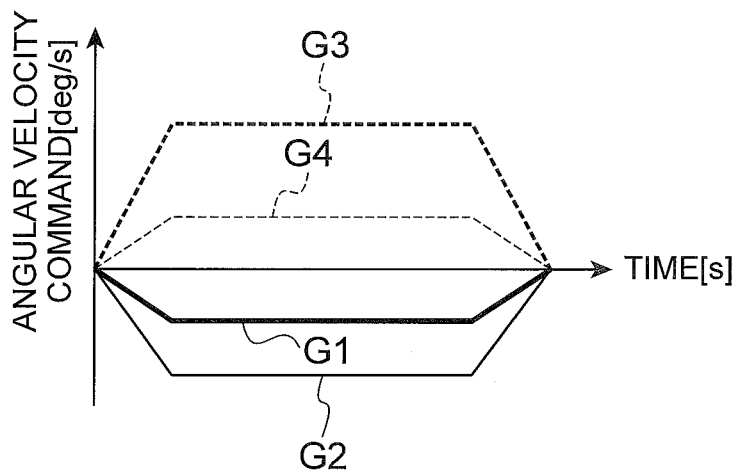
FIG. 8A is a diagram illustrating exemplary angular velocity commands based on a joint space.

First of all, a method of interpolating a relation between two points of the initial point Pr and the target point Pd1 in a joint space and obtaining a trajectory L1 (see FIG. 7) will be described. Here, the joint space refers to a space formed by active joint vectors. In the interpolation method based on the joint space, angular velocity commands of the rotational joints J1 to J7 are generated based on the difference between the joint angle of the robot R at the initial point Pr and the joint angle of the robot R at the target point Pd1. In other words, the angular velocity commands of the rotational joints J1 to J7 are generated based on the distance from the initial point Pr to the target point Pd1 and a predetermined angular velocity. FIG. 8A is exemplary angular velocity commands applied to the rotational joints J1 to J7. G1 is an angular velocity command applied to the rotational joint J2, G2 is an angular velocity command applied to the rotational joint J3, G3 is an angular velocity command applied to the rotational joint J5, and G4 is an angular velocity command applied to the rotational joint J6. The angular velocity commands are generated so that the angular velocities of the rotational joints J2, J3, J5, and J6 of the robot R have a constant value except when an operation starts or ends as illustrated in FIG. 8A. The exemplary angular velocity commands illustrated in FIG. 8A are generated under the assumption of an operation on the XZ plane in the robot coordinate system C. Thus, the angular velocities of the rotational joints J1, J4, and J7 that operate the arm 8 in the Z direction are set to zero (0).

Figure 8B:
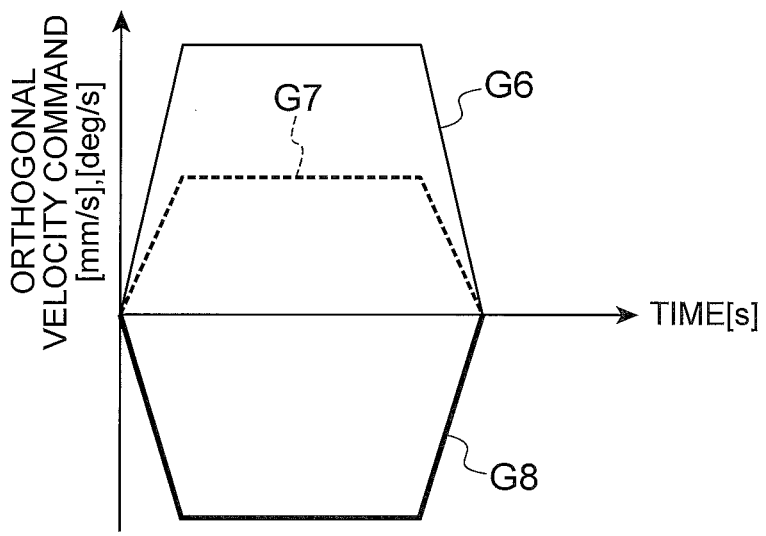
FIG. 8B is a diagram illustrating exemplary velocity commands based on an orthogonal space.
Figure 8C:
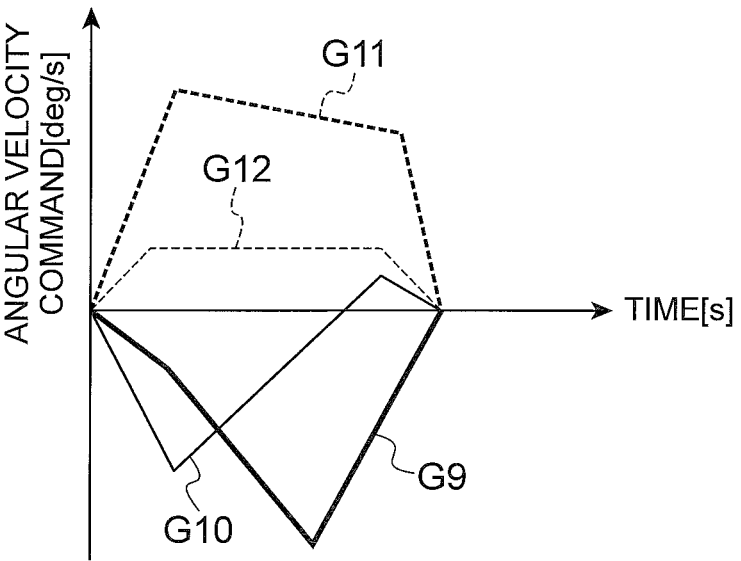
FIG. 8C is a diagram illustrating exemplary angular velocity commands based on the joint space.

Next, a method of interpolating a relation between two points of the initial point Pr and the target point Pd1 in an orthogonal space (for example, the robot coordinate system C) and obtaining a trajectory L2 (see FIG. 7) will be described. In the interpolation method based on the orthogonal space, orthogonal velocity commands of translation velocities in the X axis direction and the Z axis direction in the robot coordinate system C and a rotation velocity around the Z axis are generated based on the difference between the posture and the position of the gripper 11 at the initial point Pr and the posture and the position of the gripper 11 at the target point Pd1. In other words, histories of the translation velocity and the rotation velocity are generated based on the distance from the initial point Pr to the target point Pd1 and a predetermined certain velocity. FIG. 8B illustrate exemplary histories of the translation velocities in the X axis direction and the Z axis direction and the rotation velocity around the Z axis. G7 is a history of the translation velocity in the X axis direction, G8 is a history of the translation velocity in the Z axis direction, and G9 is a history of the rotation velocity around the Z axis. The orthogonal velocity commands are generated so that the translation velocity and the rotation velocity are constant except that an operation starts or ends as illustrated in FIG. 8B. The orthogonal velocity commands illustrated in FIG. 8B are converted into the angular velocity commands for the respective rotational joints J1 to J7. For this conversion, a calculation is performed based on the inverse kinematics. FIG. 8C illustrates a result of converting the orthogonal velocity commands into the angular velocity commands. G9 is an angular velocity command applied to the rotational joint J2, G10 is an angular velocity command applied to the rotational joint J3, G11 is an angular velocity command applied to the rotational joint J5, and G12 is an angular velocity command applied to the rotational joint J6.

In process S4, any one of the trajectory L1 generated based on the joint space as described above and the trajectory L2 generated based on the orthogonal space may be employed.

Referring back to FIG. 5, after process S4, required time data is generated (process S5). Process S5 is performed by the required time data generating unit 17. The required time data generating unit 17 generates the required time data using the trajectory data. Next, a method of calculating the required time based on the joint space and a method of calculating the required time based on the orthogonal space will be described.

According to the method based on the joint space, first of all, target values of the rotational angles of the rotational joints J1 to J7 that are necessary to reach the target point Pd1 are calculated by the inverse kinematics calculation. Then, the current values of the rotational angles of the rotational joints J1 to J7 at the initial point Pr are obtained. Then, a difference value (that is, a distance) between the target value of the rotational angle and the current value of the rotational angle is calculated, and the required time is obtained by dividing the difference value by a previously designated angular velocity. According to this method, the required time can be obtained by a simple calculation. In other words, the required time is obtained by the reverse conversion calculation of calculating the target values of the rotational angles, subtraction of obtaining the difference value between the target value and the current value of the rotational angle, and division of dividing the difference value by the angular velocity. Further, a more accurate required time may be calculated by performing an operation simulation including a delay of a servo system of the robot R and dynamic characteristics of the robot R on the angular velocity commands illustrated in FIG. 8A.

Meanwhile, according to the method based on the orthogonal space, first of all, the position and the posture of the gripper 11 at the target point Pd1 are calculated. Then, the position and the posture of the gripper 11 at the initial point Pr are calculated. Then, a difference value (that is a distance) between the position and the posture at the target point Pd1 and the position and the posture at the initial point Pr is calculated, and the required time can be obtained by dividing the difference value by a previously designated orthogonal velocity. According to this method, the required time can be calculated by the simple calculations such as subtraction of obtaining the difference value and division of dividing the difference value by the orthogonal velocity. Further, a more accurate required time may be calculated such that the velocity commands based on the orthogonal space illustrated in FIG. 8B are converted into the angular velocity commands based on the joint space illustrated in FIG. 8C, and then an operation simulation including a delay of a servo system of the robot R and dynamic characteristics of the robot R is performed on the angular velocity commands illustrated in FIG. 8C.

In process S5, any one of the required time generated based on the joint space and the required time generated based on the orthogonal space may be employed.

Then, the shape data is generated (process S6). Process S6 is performed by the shape data generating unit 18. In process S6, for example, the contour shape of the candidate work WC is calculated as the shape data based on the image data.

Then, an index value is acquired (process S7). Process S7 is performed by the index acquiring unit 23. For example, in process S7, matching of the contour shape of the candidate work WC included in the shape data and the contour shape held in the database is performed, and an index value associated with the contour shape held in the database is acquired.

Then, the presence or absence of interference is checked (process S8). Process S8 is performed by the interference checking unit 21 based on the trajectory data and model data of an obstacle.

Then, it is checked whether it is possible to perform an operation within the movable range (process S9). Process S9 is performed by the movable range checking unit 22 based on the trajectory data and the movable range information of the robot R.

Then, an evaluation value Ev is calculated (process S10). Process S10 is performed by the evaluation value calculating unit 24 based on Formula (1) described above.

Thereafter, the presence or absence of the non-processed candidate work WC is determined (process S11). When there is a non-processed candidate work WC (YES in process S11), processes S4 to S10 are performed on the non-processed candidate work WC. However, when there is no non-processed candidate work WC, next process S12 is performed (NO in process S11). As described above, in the present embodiment, the evaluation value Ev is calculated for all the candidate works WC by repeating the process of consecutively performing processes S4 to S10 on one candidate work WC.

Then, one target work WO is selected from the candidate works WC (process S12). Process S12 is performed by the target work selecting unit 19. In process S12, among the candidate works WC, the candidate work WC having the evaluation value Ev of the highest score is selected as the target work WO.

Lastly, the target work WO is picked up (process S13). The control device 4 outputs a control signal to the robot R so that the robot R performs an operation of picking up the target work WO. The robot R drives a servomotor based on the control signal, and operates the gripper 11 according to the trajectory. When the gripper 11 reaches the picking-up position (the taking-out position) of the target work WO, the control device 4 outputs a control signal to the gripper 11, and causes the gripper 11 to perform an operation of holding the target work WO. Then, the control device 4 moves the gripper 11 holding the target work WO, and causes the target work WO to be transferred to the second stocker 3. As processes S1 to S13 are performed, one work W is transferred from the first stocker 2 to the second stocker 3.

According to the robot picking system 1 of the present embodiment, the control device 4 includes the target work selecting unit 19, and the target work selecting unit 19 selects the target work WO to pick up based on the image data. Since the control device 4 controlling the operation of the robot R selects the target work WO as described above, the working state of the robot R can be considered when the target work WO is selected. Thus, the robot picking system 1 can select the target work WO that can be picked up in the more appropriate condition.

Further, in the picking-up technique, a work serving as a picking-up target is selected based on the image data in which a plurality of works are imaged, and information about the selected work is provided to the robot. The robot performs an operation (the picking-up operation) of taking out the work based on the provided information. However, a work selected based on only the image data may not be a work that can be taken out in the appropriate condition when the working state of the robot is considered.

It is an object of the present disclosure to provide a robot picking system and a method of manufacturing a workpiece, which are capable of selecting a work that can be picked up in a more appropriate condition. Further, according to the robot picking system of the present disclosure, it is possible to select a work that can be picked up in a more appropriate condition.

Further, the target work selecting unit 19 selects the target work WO using the required time data. According to the selecting of the target work WO using the required time data, it is possible to perform control such that priority is given to a time necessary for picking up in the picking-up operation.

Further, the target work selecting unit 19 selects the target work WO using the determination result of the interference checking unit 21. According to the selecting of the target work WO using the determination result of the interference checking unit 21, when there is an obstacle on the trajectory interpolating between the robot R and the candidate work WC, it is possible to determine that it is not possible to pick up according to the trajectory. Thus, it is possible to select the target work WO to pick up based on whether there is an obstacle between the robot R and the candidate work WC.

Further, the target work selecting unit 19 selects the target work WO using the index value representing the picking-up easiness degree. According to the selecting using the index value representing the picking-up easiness degree, it is possible to perform control such that priority is given to reliably performing the picking-up operation.

Further, the target work selecting unit 19 selects the target work WO using the first and second weighting coefficients $\alpha$ and $\beta$. According to the selecting using the first and second weighting coefficients $\alpha$ and $\beta$, since it is possible to adjust a priority degree of the required time and the certainty of the picking-up operation in the picking-up operation, detailed control can be performed according to the working purpose.

Further, the required time data generating unit 17 generates the required time data using the trajectory data. Since the trajectory data is used for the generation of the required time data, it is possible to generate the high-accurate required time data according to the working state of the robot R.

The exemplary embodiment of the present invention has been described above, but the present invention is not limited to the above embodiment, and various changes can be made within the scope not departing from the gist thereof. For example, the image acquiring device 6 may be arranged at an arbitrary position capable of photographing the work W of the first stocker 2 instead of being mounted to the leading end of the arm 8 of the robot R.

Further, in the above embodiment, processes S4 to S10 are consecutively performed on one candidate work WC, but the present invention is not limited to the above process method. For example, checking of interference (process S8) and checking of whether it is operable (process S9) may be performed on one candidate work WC, and the evaluation value may be calculated only for the candidate work WC having the good checking result.

Further, in the above embodiment, the method of selecting the candidate work WC, the method of calculating the trajectory, the method of calculating the required time, the method of checking the presence or absence of interference, the method of checking whether it is possible to operate within the movable range, and the definition of the evaluation value are exemplary, and not limited to the method described in the present embodiment.

Further, a desired product (workpiece) may be manufactured using the robot picking system 1.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A robot picking system, comprising:
   a robot that picks up a work in a stocker accommodating a plurality of works;
   a control device that controls an operation of the robot; and
   an image acquiring device that acquires image data including information related to the plurality of works,
   wherein the robot is secured on a base at a fixed location, the robot comprising a plurality of arm sections, and a ort ser mounted to an end of the arm sections, and
   wherein the control device comprises:
      a candidate data generating unit that generates candidate data including information of candidate works that are candidates of a picking-up target using the image data,
      a posture data generating unit that generates posture data including information of a posture and a position of the arm sections and the gripper of the robot,
      a trajectory data generating unit that generates trajectory data including information of trajectory to each of the candidate works using the posture data and the candidate data, and
      a target work selecting unit that selects a target work that is a picking-up target from the candidate works using the trajectory data,
   wherein the robot secured on the base has a movable range, and
   wherein the target work selecting unit includes a movable range checking unit configured to determine whether an operation according to the trajectory data can be performed without exceeding the movable range.

2. The robot picking system according to claim 1,
   wherein the target work selecting unit determines whether an operation of the robot according to the trajectory is hindered, and selects the target work using a determination result.

3. The robot picking, system according to claim 2,
   wherein the control device further comprises a required time data generating unit that generates required time data including information of a required time necessary to reach each candidate works using the candidate data, and
   the target work selecting unit selects the target work using the required time data.

4. The robot picking system according to claim 3,
   wherein the required time data generating unit generates the required time data using the trajectory data.

5. The robot picking system according to claim 3,
   wherein the control device further comprises a shape data generating unit that generates shape data including information of a shape based on a shape of the work using the image data, and
   the target work selecting unit acquires an index representing a picking-up easiness degree of the candidate works based on the shape data, and selects the target work using the index.

6. The robot picking system according to claim 5,
   wherein the target work selecting unit selects the target work using first evaluation data obtained by weighting the required time data with a first weighting coefficient and second evaluation data obtained by the shape data with a second weighting coefficient.

7. A method of manufacturing a workpiece by using the robot picking system defined in claim 1.

8. A robot picking system, comprising:
   a robot that picks up a work in a stocker accommodating a plurality of works;
   a control device that controls an operation of the robot; and
   an image acquiring device that acquires image data including information related to the works,
   wherein the robot is secured on a base at a fixed location, the robot comprising a plurality of arm sections, and a gripper mounted to an end of the arm sections,
   wherein the control device:
      generates candidate data including information of candidate works that are candidates of a picking-up target using the image data,
      generates posture data including information of a posture and a position of the arm sections and the gripper of the robot,
      generates trajectory data in hiding information of trajectory to each of the candidate works using the posture data and the candidate data, and
      selects a target work that is a picking-up target from the candidate works using the trajectory data,
   wherein the robot secured on the base has a movable range, and
   wherein control device determines whether an operation according to the trajectory data can be performed without exceeding the movable range.

9. A control device that controls an operation of a robot that picks up a work in a stocker accommodating a plurality of works using image data including information related to the work, the robot being secured on a base at a fixed location, the robot comprising a plurality of arm sections and a gripper mounted to an end of the arm sections, the robot secured on the base has a movable range, the control device comprising:
   a candidate data generating unit that generates candidate data including information of candidate works that are candidates of a picking-up target using the image data,
   a posture data generating unit that generates posture data including information of a posture and a position of the arm sections and the gripper of the robot,
   a trajectory data generating unit that generates trajectory data including information of trajectory to each of the candidate works using the posture data and the candidate data, and
   a target work selecting unit that selects a target work that is a picking-up target from the candidate works using the trajectory data,
   wherein the target work selecting unit includes a movable range checking unit configured to determine Whether an operation according to the trajectory data can be performed without exceeding the movable range.

10. The robot picking system according to claim 4,
    wherein the control device further comprises a shape data generating unit that generates shape data including information of a shape based on a shape of the work using the image data, and the target work selecting unit acquires an index representing a picking-up easiness degree of the candidate works based on the shape data, and selects the target work using the index.

11. A method of manufacturing a workpiece by using the robot picking system defined in claim 2.

12. A method of manufacturing a workpiece by using the robot picking system defined in claim 3.

13. A method of manufacturing a workpiece by using the robot picking system defined in claim 4.

14. A method of manufacturing a workpiece by using the robot picking system defined in claim 5.

15. A method of manufacturing a workpiece by using the robot picking system defined in claim 6.

16. The robot picking system according to claim 1, wherein the movable range checking unit determines whether the operation can be performed without exceeding the movable range by using the trajectory data, movable range information, and length information of the arm sections.

17. The robot picking system according to claim 1, wherein the target work selecting unit selects the target work using an highest evaluation value of evaluation values calculated for the candidate works based on a determination result of the movable range checking unit.

18. The robot picking system according to claim 1, wherein the target work selecting unit further includes an interference checking unit configured to determine whether the operation according to the trajectory data is hindered by interference with an obstacle.

19. The robot picking system according to claim 18, wherein the control device further comprises a required time data generating unit that generates required time data including information of a required time necessary to reach each candidate works using the candidate data, and wherein the target work selecting unit acquires an index representing a picking-up easiness degree of the candidate works based on the shape data, and wherein the target work selecting unit selects the target work using a highest evaluation value of evaluation values calculated for the candidate works based on the required time data, the index, a determination result of the interference checking unit, and a determination result of the movable range checking unit.

* * * * *